United States Patent
Handing et al.

(10) Patent No.: US 8,043,681 B2
(45) Date of Patent: Oct. 25, 2011

(54) METHOD OF MAKING A HYBRID STRUCTURE, AND HYBRID STRUCTURE

(75) Inventors: Christian Handing, Langenberg (DE); Christian Hielscher, Delbrück (DE); Andreas Hitz, Erwitte (DE); Andreas Wille, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 399 days.

(21) Appl. No.: 12/335,013

(22) Filed: Dec. 15, 2008

(65) Prior Publication Data
US 2009/0162688 A1 Jun. 25, 2009

(30) Foreign Application Priority Data

Dec. 20, 2007 (DE) .................. 10 2007 062 524

(51) Int. Cl.
*B29C 47/00* (2006.01)
*F16L 55/00* (2006.01)
*B28B 5/00* (2006.01)

(52) U.S. Cl. ....... 428/36.9; 138/108; 138/121; 264/250; 264/241

(58) Field of Classification Search ............ 428/598, 428/36.9, 35.8; 264/250, 478, 40.5, 241; 228/249, 189, 108; 285/238, 21.1, 285.1, 285/286.1, 223, 22, 133.11, 133.21, 133.5, 133.6; 403/170, 271, 272, 265; 138/108, 121

See application file for complete search history.

(56) References Cited

U.S. PATENT DOCUMENTS 4,629,111 A * 12/1986 Salama et al. ............... 228/182
2006/0232107 A1 * 10/2006 Wieschermann et al. .... 296/211

FOREIGN PATENT DOCUMENTS

| DE | 42 42 896 C2 | 7/1994 |
| DE | 103 46 097 A1 | 5/2005 |
| DE | 10 2004 050 161 | 6/2005 |
| DE | 10 2004 053 130 | 5/2006 |
| DE | 10 2005 056 460 | 6/2007 |
| DE | 10 2007 059 057 | 6/2008 |

* cited by examiner

*Primary Examiner* — Rena Dye
*Assistant Examiner* — Yan Lan
(74) *Attorney, Agent, or Firm* — Henry M. Feiereisen; Ursula B. Day

(57) ABSTRACT

In a method of making a hybrid structure, at least one support body is fixed in a tube component which is then placed in an injection molding tool. An injection-molded part is injection-molded to an outer surface of the tube component in an area of the support body. As a result, the tube component is inwardly deformed, when regions adjacent to the support body are exposed to an injection pressure, and forms indentations for engagement of the injection-molded part.

28 Claims, 1 Drawing Sheet

METHOD OF MAKING A HYBRID STRUCTURE, AND HYBRID STRUCTURE

CROSS-REFERENCES TO RELATED APPLICATIONS

This application claims the priority of German Patent Application, Serial No. 10 2007 062 524.5, filed Dec. 20, 2007, pursuant to 35 U.S.C. 119(a)-(d), the content of which is incorporated herein by reference in its entirety as if fully set forth herein.

BACKGROUND OF THE INVENTION

The present invention relates to a method of making a hybrid structure, such as e.g. a dashboard support, in combined steel-plastic construction, as well as to such a hybrid structure.

Nothing in the following discussion of the state of the art is to be construed as an admission of prior art.

Current passenger cars use dashboard supports as supporting structure, with the dashboard supports satisfying different cockpit functions. The dashboard support has a cross member which extends from a driver-side A pillar to a passenger-side A pillar and reinforces the vehicle body. Cross members are typically made from one or more tubes, profiled cross sections, or pressed shells. Various mounts or castings are hereby joined to the cross member to provide, for example, mountings for the longitudinal column as well as receptacles for airbags. A cross member is normally provided with holes, stampings, and bends, but still has to meet crash, static, and vibration standards, despite its complex configuration.

German Offenlegungsschrift DE 103 46 097 A1 discloses dashboards supports made in composite construction, e.g. by injection molding plastic parts to steel tubes. Polypropylene or polyamide are mostly used as plastic in this construction, with the actual connection between the cross member and the molded-on plastic structure being established by a form fit. As a result, the plastic part is normally enveloping and/or molded around to the steel tube. More current approaches suggest to coat the metal components so as to realize a material union between the metal and the plastic components.

A drawback of molding-on plastic components is the accompanying deformation of the metal component as a result of the high injection pressures. Thus, the reduction of the wall thickness desired for reasons of weight savings for steel tubes, profiled cross sections or pressed shells is possible only to a limited degree.

It would therefore be desirable and advantageous to provide an improved method of making a hybrid structure and an improved hybrid structure to obviate prior art shortcomings and to allow to mold injection-molded parts to the outer surfaces of a tube component, with the wall thickness of the tube component being reduced sufficient to be able to make a defined connection which can be implemented between the tube component and the molded-on injection-molded part, despite stress caused by the injection pressure.

SUMMARY OF THE INVENTION

According to one aspect of the present invention, a method of making a hybrid structure includes the steps of fixing at least one support body in a tube component, placing the tube component in an injection molding tool, and molding an injection-molded part to an outer surface of the tube component in an area of the support body, thereby causing the tube component to inwardly deform, when regions adjacent to the support body are exposed to an injection pressure, and to form indentations for engagement of the injection-molded part.

The present invention resolves prior art problems by attaching at least one support body in the tube component, with the support body being arranged within the area subject to the injection pressure and with the tube component being supported from the inside in opposition to pressure forces exerted from outside during the injection molding process. The wall thickness of the tube component can be reduced so that the tube component is inwardly deformed in areas adjacent to the support body when subjected to the injection pressure so that indentations are formed in which the injection-molded part ultimately engages. As a result, a form fit is established between the injection-molded part and the tube component.

When a tube component without inner support body is involved, the injection pressure during the molding process causes a symmetric constriction. As a consequence, the molded-on injection-molded part is able to pivot about the longitudinal direction of the tube component, i.e. a pivoting is not prevented by form fit. When the wall thickness is very small, such a molding operation is not possible as the tube component would collapse under the load. By positioning a suitable support body in particular in midsection of the molded zone, the inwardly directed deformation is reduced in the immediate area of the support body because the wall of the tube component is pressed against the outer perimeter of the support body. As a result, the extent of the inwardly directed constriction is significantly smaller. The material of the tube components is thus less exposed to stress. The form fit as a result of two indentations positioned laterally of the support body is as good as in the case of only a single indentation or even better.

According to another feature of the present invention, the support body has an outer cross section which may be congruent to an inner cross section of the tube component. The tube component includes in particular a circular inner cross section so that the support body has a circular outer cross section. The term "tube component" within the meaning of the present invention relates not only to tubes but also to profiled cross sections or pressed shells, which then are provided with an injection-molded part through molding-on by means of an injection molding tool. Thus, the outer cross section of the tube component does not necessarily have to be circular but may also be non-circular, in particular may have corners.

Circular cross sections allow a pivoting of an injection-molded part about the longitudinal direction of the tube component. In order to prevent this degree of freedom, it is possible to secure in the tubular component support bodies which have an outer cross section that is incongruent to the inner cross section of the tube component. As a result, the tube component is unevenly constricted in the area of the support body when exposed to the injection pressure. As the constricted area is filled out by the material of the injection-molded part, the varying constriction has the effect that the injection-molded part can no longer rotate about the longitudinal axis of the tube component. Thus, all six degrees of freedom of the injection-molded part are fixed by the form fit.

It is also possible within the scope of the invention, to provide incongruent support bodies in addition, when tube components are involved that have an outer cross section which deviates from the circular cross section and therefore would fix anyway all six degrees of freedom of the injection-molded part during molding in order to further enhance the form fit.

The support body should have a weight which is as small as possible. When exposed to an even load from outside, it can be configured in the form of a ring in particular. Currently preferred is, however, the provision of disk-shaped support bodies, in particular in the form of bulkheads which are fixed in the tube component before the molding-on process. The term "fixation" relates in this context, e.g. to a material-interconnecting connection between the tube component and the support body. Tube components and support bodies are hereby made suitably from materials which can easily bond, in particular a steel-steel pair. It is, however, also conceivable to fix the support body by interference fit as it is fixed in place anyway during molding by the constriction of the tube component. In this case, material-interconnecting fixation is omitted. Of course, a form fitting fixation of the support body is also conceivable. In the end, what is important is only that the support body is arranged at the targeted position during the injection molding process. Several support bodies can be provided per injection-molded part. Several support bodies may be distanced and/or interconnected by spacers.

A method according to the invention is advantageously applicable especially when the tube component is made of steel and the injection-molded part is made of plastic. It is, however, also conceivable to make the injection-molded part from light metal, in particular of aluminum, or an aluminum alloy, or of magnesium, or of a magnesium alloy. Aluminum or magnesium alloys may be connected by Al die casting or Mg die casting processes with a tube component of steel. Although this leads to a higher weight compared to injection-molded parts of plastic, the use of metallic components normally results however in greater stiffness and crash stability of the hybrid structure.

It is also possible to make the tube component of light metal, like, e.g., of aluminum, an aluminum alloy, magnesium, or a magnesium alloy. The injection-molded part may be made in this case of a plastic material.

According to another feature of the present invention, an adhesion-promoting layer may be applied onto the tube component. In this way, it is possible to not only connect the injection-molded part with the tube component by form fit but also by material union. This provides the option to injection-mold the injection-molded part to the tube component over a circumferential region of smaller than 360°. The need for a complete enveloping of the injection-molded part is eliminated as a result. There is thus a saving potential by the possibility to a) reduce the wall thickness of the tube component, b) create a very good form fit at the same time without the need for the injection-molded part to fully envelope the tube component. Overall, the proposed method is able to produce a hybrid structure, in particular a cross member for a dashboard support of a motor vehicle in a particularly simple manner.

According to another aspect of the present invention, a hybrid structure includes a tube component having inwardly directed indentations formed as a result of exposure to an injection pressure, an injection-molded part, and a support body arranged inside the tube component in an area of the injection-molded part between the indentations of the tube component for engagement of the injection-molded part.

A hybrid structure according to the invention thus includes a tube component and an injection-molded part which is molded onto the tube component, with a support body being arranged inside the tube component in the area of the injection-molded part and located between the indentations of the tube component that are inwardly directed as a result of the injection pressure, wherein the injection-molded part engages the indentations formed by the injection pressure.

As a result of the use of a support body, the degree of constriction of the tube component is smaller. The material of the tube component is under less stress so that material with thinner wall thicknesses can be used.

The support body may have an outer cross section which is congruent or incongruent to the inner cross section of the tube component. A congruent cross section leads to an even constriction of the tube component, while an incongruent outer cross section of the support body leads to an uneven constriction. Depending on the type of the constriction, the molded-on injection-molded part may still be rotated about the longitudinal axis of the tube component or fixed in all degrees of freedom.

The support body may be constructed in particular as bulkhead which is located in the form of a disk within the tube component.

According to another feature of the present invention, the tube component may be made of steel, with the injection-molded part made of light metal, in particular aluminum, or an aluminum alloy, or magnesium, or a magnesium alloy. It is also conceivable to produce the tube component of light metal, in particular aluminum, or an aluminum alloy, or magnesium, or a magnesium alloy. The tube component can be in particular a profiled extrusion part which is connected to an injection-molded part. Especially weight-saving is the production of the injection-molded part of plastic. In addition to the form fitting connection, an adhesion-promoting layer may be applied onto the tube component to be able to fix in particular injection-molded parts of plastic not only form fittingly but also by interference fit. This allows to eliminate the need for an envelope of the injection-molded part to provide a full form fit so that the injection-molded part extends over a circumferential area of the tube component which is smaller than 360°.

The hybrid structure according to the invention is in particular a cross member for a dashboard support of a motor vehicle. In this context, the injection-molded part is in particular a holder, for example for securement of a steering column. Injection-molded parts of light metal could conceivably be constructed with A pillar attachments, as described above and in afore-described configuration.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
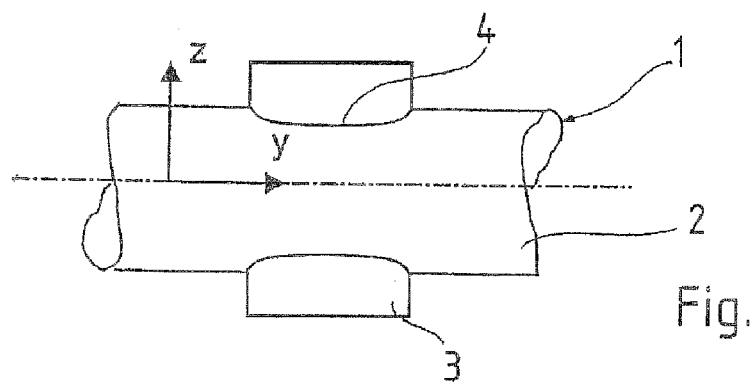
FIG. 1 is a side view of a prior art tube component with molded-on injection-molded part.

Throughout all the figures, same or corresponding elements may generally be indicated by same reference numerals. These depicted embodiments are to be understood as illustrative of the invention and not as limiting in any way. It should also be understood that the FIGS. are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a prior art embodiment. The illustrated area of the hybrid structure 1 includes a tube component 2 made in particular of steel. The tube structure 2 has a circular cross section. The tube component 2 has been placed in an injection molding tool which is not shown in greater detail and in which an injection-molded part 3 has been molded on. As a result of the exposure to the injection pressure, the tube component 2 deforms so as to realize a circumferential wrap-around indentation 4 in the form of an even constriction, The wall thickness of the tube component cannot be reduced as the constriction causes the indentation 4 to progressively increase in size, requiring continuously more material to fix the injection-molded part 3 in order to fill out the indentation 4. This causes an increase in weight without significantly improving the form fit between the tube component 2 and the injection-molded part 3, and in particular without preventing the rotation about the Y axis of the tube component.

Figure 2:
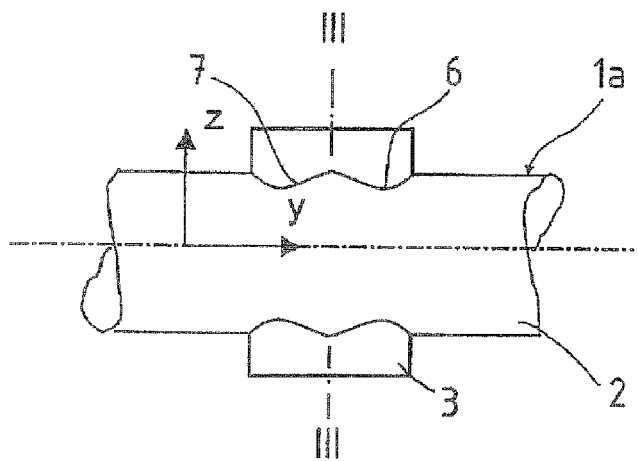
FIG. 2 is a side view of a first embodiment of a hybrid structure according to the invention with inserted support body.
Figure 3:
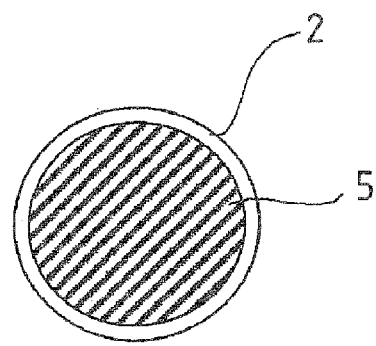
FIG. 3 is a sectional view, taken along the line III-III of FIG. 2.

Turning now to FIGS. 2 and 3, there are shown a first exemplary embodiment of a hybrid structure according to the invention. Parts corresponding with those in FIG. 1 are denoted by identical reference numerals for sake of simplicity. The description below will center on the differences between the embodiments. In this embodiment, provision is made for a hybrid structure, generally designated by reference numeral 1a, which has incorporated therein a support body 5 in the area of the cross sectional plane III-III (FIG. 3). The support body 5 is formed as a circular bulkhead having an outer cross section which is congruent to the circular inner cross section of the tube component 2.

As can be seen from FIG. 2, the tube component 2 is not constricted during molding on the injection-molded part because of the presence of the support body 5 so that two indentations 6, 7 are now realized to the side of the position of the support body 5. The total constricted area is smaller. Less material needs to be used for the injection-molded part 3 as the volume of the indentations 6, 7 is smaller. In addition, it is possible to reduce the wall thickness of the tube component 2 because the presence of an excessive constriction is prevented as a result of the incorporation of the support body 5. Basically, it is conceivable to arrange several such support bodies 5 within the tube component 2, with the support bodies 5 suitably arranged at sufficient distance in relation to one another to permit the presence of constrictions in the desired manner for realization of the form fit.

Figure 4:
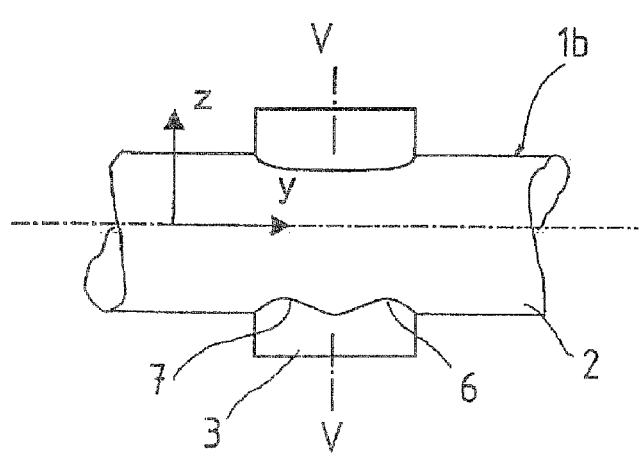
FIG. 4 is a side view of a second embodiment of a hybrid structure according to the invention with inserted support body.
Figure 5:
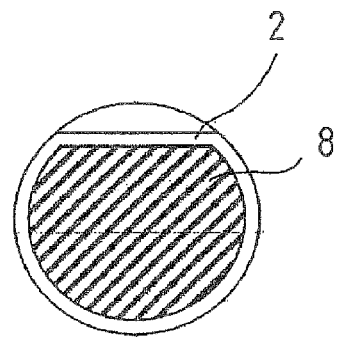
FIG. 5 is a sectional view, taken along the line V-V of FIG. 4.

The embodiment of FIGS. 4 and 5 differs from the one of FIGS. 2 and 3 by providing the hybrid structure 1b with a support body 8 which is flattened on the upper side, as viewed in the image plane, so that the outer cross section of the support body 8 is incongruent to the circular inner cross section of the tube component 2. As a result, a constriction is realized which is uneven as viewed over the circumference. The upper region in the image plane shows a constriction which extends over the entire width of the injection-molded part 3 while the depth remains constant as a result of the flattened area of the support body 8. The lower image margin in FIG. 4 shows that again two constrictions 6, 7 are formed side-by-side as a result of the central support provided by the support body 8 in the area of the plane V-V. In the exemplary embodiment of FIGS. 2 and 3, the injection-molded part 3 can rotate about the Y axis. In the exemplary embodiment of FIGS. 4 and 5, the injection-molded part 3 is fixed in all six degrees of freedom.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of making a hybrid structure, comprising the steps of:
    fixing at least one support body in a tube component which defines a longitudinal axis;
    placing the tube component in an injection molding tool; and
    injection-molding an injection-molded part to an outer surface of the tube component in an area of the support body, thereby causing deformation of the tube component and formation of at at least two inwardly directed indentations configured side-by-side in a direction of the longitudinal axis, when regions adjacent to the support body are exposed to an injection pressure during injection molding.

2. The method of claim 1, wherein the support body has an outer cross section which is congruent to an inner cross section of the tube component.

3. The method of claim 1, wherein the support body has an outer cross section which is incongruent to an inner cross section of the tube component.

4. The method of claim 1, wherein the support body is a bulkhead.

5. The method of claim 1, wherein the tube component is made of steel, and the injection-molded part is made of light metal.

6. The method of claim 1, wherein the injection-molded part is made of aluminum or an aluminum alloy.

7. The method of claim 1, wherein the injection-molded part is made of magnesium or a magnesium alloy.

8. The method of claim 1, wherein the injection-molded part is made of plastic.

9. The method of claim 1, wherein the tube component is made of light metal and the injection-molded part is made plastic.

10. The method of claim 9, wherein the light metal is selected from the group consisting of aluminum, an aluminum alloy, magnesium, and a magnesium alloy.

11. The method of claim 1, further comprising the step of applying an adhesion-promoting layer onto the tube component.

12. The method of claim 1, wherein the injection-molded part is injection-molded to the tube component over a circumferential region of smaller than 360°.

13. A hybrid structure, comprising:
    a tube component defining a longitudinal axis and having at least two inwardly directed indentations configured side-by-side in a direction of the longitudinal axis;

an injection-molded part attached to the tube component through injection molding, thereby causing deformation of the tube component and formation of the inwardly directed indentations as a result of exposure to an injection pressure during injection molding; and a support body arranged inside the tube component in an area of the injection-molded part between the indentations of the tube component for engagement of the indentations by the injection-molded part.

14. The hybrid structure of claim 13, wherein the support body has an outer cross section which is congruent to an inner cross section of the tube component.

15. The hybrid structure of claim 13, wherein the support body has an outer cross section which is incongruent to an inner cross section of the tube component.

16. The hybrid structure of claim 13, wherein the support body is a bulkhead.

17. The hybrid structure of claim 13, wherein the tube component is made of steel, and the injection-molded part is made of light metal.

18. The hybrid structure of claim 13, wherein the injection-molded part is made of aluminum or an aluminum alloy.

19. The hybrid structure of claim 13, wherein the injection-molded part is made of magnesium or a magnesium alloy.

20. The hybrid structure of claim 13, wherein the injection-molded part is made of plastic.

21. The hybrid structure of claim 13, wherein the tube component is made of light metal and the injection-molded part is made plastic.

22. The hybrid structure of claim 21, wherein the light metal is selected from the group consisting of aluminum, an aluminum alloy, magnesium, or a magnesium alloy.

23. The hybrid structure of claim 13, further comprising an adhesion-promoting layer applied onto the tube component.

24. The hybrid structure of claim 13, wherein the injection-molded part extends over a circumferential region of the tube component of smaller than 360°.

25. The hybrid structure of claim 13, for use as a cross member of a motor vehicle.

26. The hybrid structure of claim 13, wherein the injection-molded part is a mounting.

27. The hybrid structure of claim 13, wherein the injection-molded part is a A pillar attachment.

28. The hybrid structure of claim 13, wherein the injection-molded part is a steering column mounting.

* * * * *